United States Patent
Xia et al.

(10) Patent No.: US 10,696,171 B2
(45) Date of Patent: Jun. 30, 2020

(54) CHARGING METHOD, DEVICE AND STORAGE MEDIUM FOR CLEANING ROBOT

(71) Applicant: Beijing Xiaomi Mobile Software Co., Ltd., Haidian District, Beijing (CN)

(72) Inventors: Yongfeng Xia, Beijing (CN); Ke Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 225 days.

(21) Appl. No.: 15/957,934

(22) Filed: Apr. 20, 2018

(65) Prior Publication Data
US 2018/0304758 A1    Oct. 25, 2018

(30) Foreign Application Priority Data

Apr. 25, 2017    (CN) .......................... 2017 1 0278733

(51) Int. Cl.
*G05D 1/00* (2006.01)
*B60L 11/18* (2006.01)
(Continued)

(52) U.S. Cl.
CPC ......... *B60L 11/1824* (2013.01); *B25J 9/1679* (2013.01); *B25J 11/0085* (2013.01);
(Continued)

(58) Field of Classification Search
None
See application file for complete search history.

(56) References Cited

U.S. PATENT DOCUMENTS

| 5,220,263 A | 6/1993 | Onishi et al. |
| 2011/0202175 A1* | 8/2011 | Romanov ........... A47L 11/4011 700/250 |

(Continued)

FOREIGN PATENT DOCUMENTS

| CN | 103099583 A | 5/2013 |
| CN | 103580293 A | 2/2014 |

(Continued)

OTHER PUBLICATIONS

Su K L et al: "Motion Planning of Multi-docking System for Intelligent Mobile Robots", Su K L et al, 2014 International Symposium on Computer, Consumer and Control, IEEE, published on Jun. 10, 2014, pp. 1279-1282, XP032813016, DOI: 10.1109/IS3C.2014.330, retrieved on Jun. 27, 2014.

(Continued)

*Primary Examiner* — Richard M Camby
(74) *Attorney, Agent, or Firm* — Jun He Law Offices P.C.; James J. Zhu (57) ABSTRACT

The present disclosure relates to a charging method and a charging apparatus of a cleaning robot. With the method, position information of a plurality of charging ports available for the cleaning robot is obtained; when it is determined that the cleaning robot needs to be charged, current position information of the cleaning robot is obtained; a closest charging port from the plurality of charging ports which is the closest to a current position of the cleaning robot is determined according to the position information of the plurality of charging ports and the current position information of the cleaning robot; and the cleaning robot is controlled to move to the closest charging port according to the position information of the closest charging port. With the technical solution, the cleaning robot may be charged (Continued)

nearby, thereby reducing power consumption of the cleaning robot.

15 Claims, 7 Drawing Sheets (51) Int. Cl.
    *B25J 11/00*     (2006.01)
    *B25J 9/16*     (2006.01)
    *G05D 1/02*     (2020.01)
    *B60L 53/30*     (2019.01)

(52) U.S. Cl.
    CPC ............ *B60L 53/30* (2019.02); *G05D 1/0088* (2013.01); *G05D 1/0217* (2013.01); *G05D 1/0225* (2013.01); *G05D 1/0274* (2013.01); *B60L 2240/60* (2013.01); *B60L 2260/32* (2013.01); *G05D 2201/0203* (2013.01); *Y10S 901/01* (2013.01); *Y10S 901/09* (2013.01)

(56) References Cited

U.S. PATENT DOCUMENTS

2015/0150428 A1     6/2015   Park et al.
2017/0364087 A1*  12/2017  Tang .................... G05D 1/0088
2018/0275668 A1*   9/2018  Diehr ................... G05D 1/0225

FOREIGN PATENT DOCUMENTS

| | | |
|---|---|---|
| CN | 105446342 A | 3/2016 |
| CN | 105527961 A | 4/2016 |
| JP | 2014137767 A | 7/2014 |
| WO | 2016050215 A1 | 4/2016 |

OTHER PUBLICATIONS

Office Action from EPO in EP application No. 18168693.2, dated Aug. 1, 2018.
ISR and written opinions for PCT application PCT/CN2017/095345, dated Jan. 25, 2018.
Office Action for Japanese Patent Application No. 2017-551111, dated Jul. 26, 2019.
Office Action for European Patent Application No. 18168693.2, dated Sep. 16, 2019.
The First Office Action in Chinese Patent Application No. 201710278733.5, dated Dec. 14, 2018.

* cited by examiner

CHARGING METHOD, DEVICE AND STORAGE MEDIUM FOR CLEANING ROBOT

CROSS REFERENCE TO RELATED APPLICATION

This application is based upon and claims a priority to Chinese Patent Application No. 201710278733.5, filed with the State Intellectual Property Office of P. R. China on Apr. 25, 2017, the entire contents of which are incorporated herein by reference.

TECHNICAL FIELD

The present disclosure relates to the field of smart home technology, and more particularly, to a charging method, a charging device and a storage medium of a cleaning robot.

BACKGROUND

With developments of science and technology, there are more and more electronic devices, such as robots. It has been a trend to use the robots to do housework instead of human. For example, a cleaning robot can help people to clean the room by automatically moving itself and sucking up dusts on the floor without user operations.

When the cleaning robot begins to work, a cleaning task may be established. When the cleaning task is accomplished or an electric quantity is less than a preset value, the robot will go back to a charging port to charge itself.

SUMMARY

According to embodiments of the present disclosure, a charging method for a cleaning robot is provided. The method is applied to the cleaning robot and comprises: obtaining position information of a plurality of charging ports available for the cleaning robot; obtaining, when determining that the cleaning robot needs to be charged, current position information of the cleaning robot; determining a closest charging port from the plurality of charging ports which is the closest to a current position of the cleaning robot according to the position information of the plurality of charging ports and the current position information of the cleaning robot; and controlling the cleaning robot to move to the closest charging port to charge according to position information of the closest charging port.

According to embodiments of the present disclosure, a charging device for a cleaning robot is provided. The device may be applied to the cleaning robot and comprise: a processor; a memory for storing instructions executable by the processor; wherein, the processor is configured to perform the acts of: obtaining position information of a plurality of charging ports available for the cleaning robot; obtaining, when determining that the cleaning robot needs to be charged, current position information of the cleaning robot; determining a closest charging port from the plurality of charging ports which is the closest to a current position of the cleaning robot according to the position information of the plurality of charging ports and the current position information of the cleaning robot; and controlling the cleaning robot to move to the closest charging port to charge according to position information of the closest charging port.

According to embodiments of the present disclosure, a non-transitory computer-readable storage medium is provided, which is stored with computer programs that are applied to a cleaning robot and when executed by a processor, cause the processor to perform the above charging method for a cleaning robot.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

When there are a plurality of charging piles in a cleaning area for a cleaning robot or a cleaning robot carries plugs that may adapt to several kinds of jacks (such as three holes, two holes, etc.) and thus can adapt to jacks of a plurality of sockets in the cleaning area, the robot may have a plurality of charging positions. Therefore, it has become a problem to be solved to select which one of the charging positions to charge the robot.

To solve the above problem, in the present embodiment, position information of a plurality of charging ports available for the cleaning robot is obtained. When it is determined that the cleaning robot needs to be charged, current position information of the cleaning robot is obtained. A closest charging port from the plurality of charging ports which is the closest to a current position of the cleaning robot is determined according to the position information of the plurality of charging ports and the current position information of the cleaning robot. The cleaning robot is controlled to move to the closest charging port to charge, thereby avoiding a too long moving distance of the cleaning robot, making the cleaning robot to charge nearby and saving power consumption of the cleaning robot.

Figure 1:
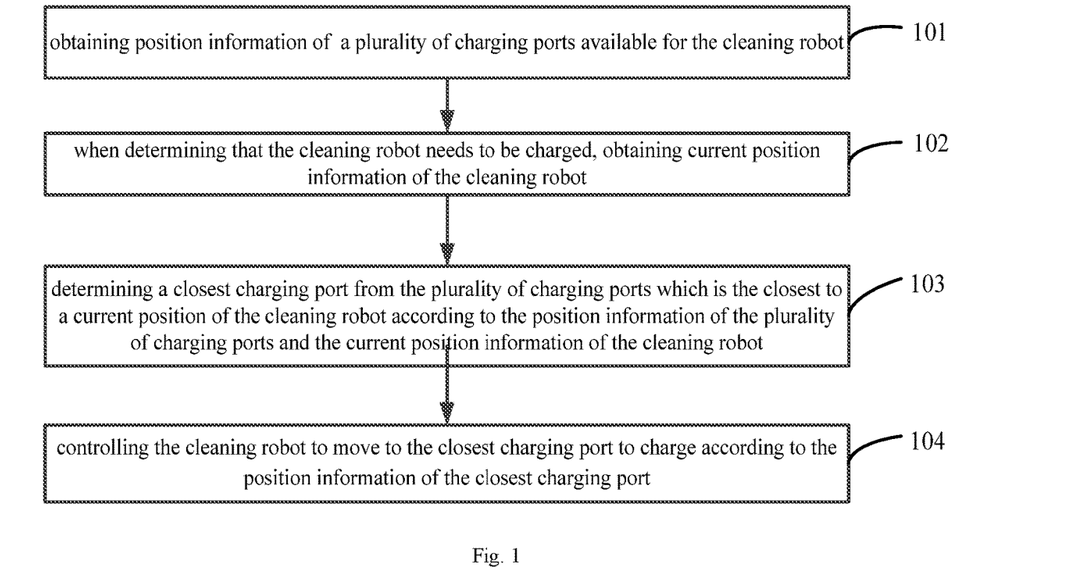
FIG. 1 is a flow chart showing a charging method for a cleaning robot according to an exemplary embodiment.

FIG. 1 is a flow chart showing a charging method for a cleaning robot according to an exemplary embodiment. As shown in FIG. 1, the charging method of the cleaning robot may be applied in a device such as the cleaning robot, and the method includes acts 101 to 104.

At block 101, position information of a plurality of charging ports available for the cleaning robot is obtained.

In detail, the positions of the plurality of charging ports may be set by a user when the cleaning robot obtains a map of a cleaning area. Or, data connections may be established among the cleaning robot and the plurality of charging ports, and the positions of the plurality of charging ports may be obtained through infrared, blue tooth, ultrasonic or radio communication. There are no limits on that in the present embodiment.

At block 102, when it is determined that the cleaning robot needs to be charged, current position information of the cleaning robot is obtained.

In detail, the cleaning robot may record its position in the map of the cleaning area, thus its current position information can be obtained.

At block 103, a closest charging port from the plurality of charging ports which is the closest to a current position of the cleaning robot is determined according to the position information of the plurality of charging ports and the current position information of the cleaning robot.

In detail, when determining the closest charging port, respective distances between the cleaning robot and the plurality of charging ports may be obtained as respective straight-line distances between the cleaning robot and the plurality of charging ports or lengths of respective paths for the cleaning robot to move from the current position to the plurality of charging ports in a way of straight moving. Further, a cleaning route of the cleaning robot may be considered, respective paths from the cleaning robot to the plurality of charging ports may be calculated on the cleaning route and their lengths are used as the distances between the cleaning robot and the plurality of charging ports. There are no limits on that in the present embodiment.

At block 104, the cleaning robot is controlled to move to the closest charging port according to the position information of the closest charging port.

Figure 2:
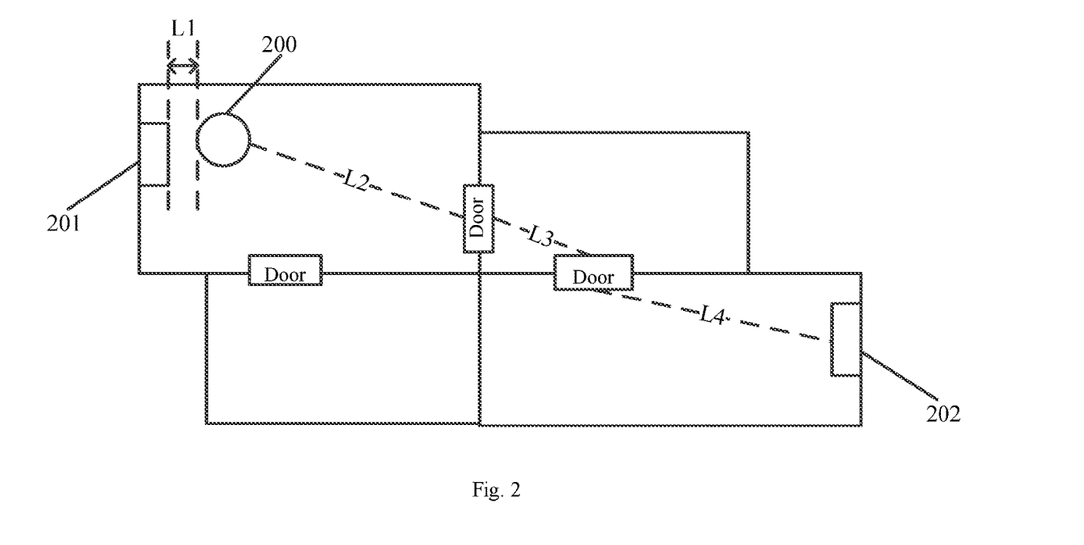
FIG. 2 is a schematic diagram illustrating an application scenario of charging a cleaning robot according to an exemplary embodiment.

FIG. 2 is a schematic diagram illustrating an application scenario of charging a cleaning robot according to an exemplary embodiment.

In an embodiment, with reference to FIG. 2, a room area shown in FIG. 2 is a working area of a cleaning robot 200 and has charging ports 201 and 202 inside. When the cleaning robot 200 enters into the working area, position information of charging port 201 and position information of charging port 202 are obtained first. Referring to FIG. 2, when it is determined that the cleaning robot 200 needs to be charged at a position shown in FIG. 2, the cleaning robot 200 may obtain its current position information. The position information of the charging ports and the position information of the cleaning robot may be coordinate information. In this embodiment, taking the lengths of the respective paths for the cleaning robot to move from the current position to the charging ports in a way of straight moving as the distances, a way of determining the charging port which is closest to the current position of the cleaning robot is illustrated as follows. The distance between the current position of the cleaning robot 200 and the position of the charging port 201 is calculated according to the current position information of the cleaning robot 200 and the position information of the charging port 201, which is denoted as L1. The distance between the current position of the cleaning robot 200 and the position of the charging port 202 is calculated according to the current position information of the cleaning robot 200 and the position information of the charging port 201, which is denoted as L2+L3+L4. When L1<L2+L3+L4, the charging port 201 which is the closest to the current position of the cleaning robot 200 may be selected by the cleaning robot 200, and the cleaning robot 200 is controlled to move through distance L1 to the charging port 201 to charge. Comparing to controlling the cleaning robot 200 to move through distance L2+L3+L4 to the charging port 202 to charge, by controlling the cleaning robot 200 to move through distance L1 to the closest charging port 201 to charge, it may avoid a too long moving distance of the cleaning robot, make the cleaning robot to charge nearby and save power consumption of the cleaning robot.

In this embodiment, when it is determined that the cleaning robot needs to be charged, the cleaning robot is controlled to move to the charging port which is the closest to the current position of the cleaning robot to charge, thereby avoiding a too long moving distance of the cleaning robot, making the cleaning robot to charge nearby and saving power consumption of the cleaning robot.

In an alternative embodiment, the charging method of the cleaning robot may further include acts A1 and A2.

In act A1, when charging the cleaning robot at the closest charging port is completed, a first cleaning route is determined starting from the closest charging port.

In act A2, the cleaning robot is controlled to work along the first cleaning route.

In an embodiment, with reference to FIG. 2, the cleaning robot 200 is charged initially at charging port 202 and then begins to work. When the whole area is cleaned up, the cleaning robot 200 is located at the position shown in FIG. 2. Here, the closest charging port is charging port 201. When the cleaning robot 200 finishes the charging at the closest charging port 201 and begins a next cleaning task, the first cleaning route of the cleaning robot 200 starting from charging port 201 may be determined. Thus the cleaning robot 200 may clean along the first cleaning route instead of returning back to the previous route corresponding to the charging port 202, thereby improving the cleaning efficiency.

In this embodiment, when charging the cleaning robot at the closest charging port is completed, the first cleaning route starting from the closest charging port is determined. The cleaning robot then works along the first cleaning route. Since the cleaning route that is different from the previous one is adopted according to the charging port where the cleaning robot is charged, the cleaning efficiency is improved.

In an alternative embodiment, determining that the cleaning robot needs to be charged in block 102 in the charging method for the cleaning robot may be performed as act B1.

In act B1, when a remaining electric quantity of the cleaning robot is less than a preset value, it is determined that the cleaning robot needs to be charged.

In an embodiment, it may be determined that the cleaning robot needs to be charged when the remaining electric quantity of the cleaning robot is too less to support continuing a certain cleaning operation but is enough to support moving to a charging port. Here the preset value may be set as an electric quantity which can cover highest power consumption for the cleaning robot to move from a farthest position from the charging port to the charging port when the cleaning robot only performs a moving operation, so as to ensure the remaining electric quantity of the cleaning robot can support automatically moving back to the charging port to charge. Certainly, the preset value may also be set as an electric quantity which can cover highest power consumption for the cleaning robot to move from a farthest position from the charging port to the charging port when the cleaning robot performs a cleaning operation at the same time, so as to ensure the remaining electric quantity of the cleaning robot can support moving back to the charging port to charge as well as performing the cleaning operation.

In this embodiment, when the electric quantity of the cleaning robot is less than the preset value, it is determined that the cleaning robot needs to be charged, thus ensuring that the cleaning robot always has enough electric quantity to automatically move back to the charging port to charge and the cleaning operation can be carried on smoothly.

In an alternative embodiment, the charging method of the cleaning robot may further include acts C1 and C2.

In act C1, when charging the cleaning robot at the closest charging port is completed, a second cleaning route starting from the closest charging port and directed to a target area which has not been cleaned by the cleaning robot is determined.

In act C2, the cleaning robot is controlled to work along the second cleaning route to clean the target area.

Figure 3:
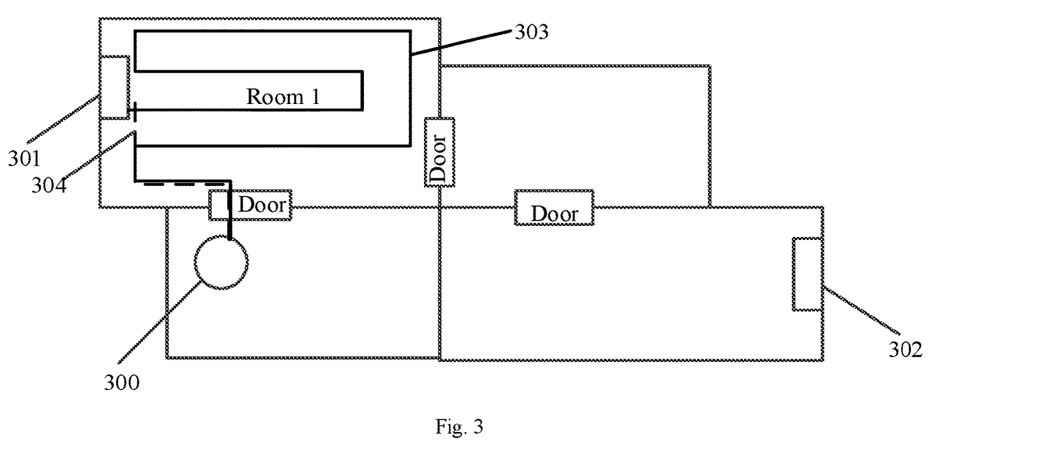
FIG. 3 is a schematic diagram illustrating another application scenario of charging a cleaning robot according to an exemplary embodiment.

In an embodiment, FIG. 3 is a schematic diagram illustrating another application scenario of charging a cleaning robot according to an exemplary embodiment. Referring to FIG. 3, when the cleaning robot 300 is executing a cleaning task and there are still some areas, for example room 1, haven't been cleaned, an electric quantity of the cleaning robot 300 becomes less than a preset value and it is determined that the cleaning robot 300 needs to be charged. In this case, the cleaning robot 300 may select a charging port 301 which is the closest to its current position to charge instead of a farther charging port 302, so as to save power consumption of the cleaning robot 300. When the cleaning robot 300 finishes the charging, it won't go back to the position shown in FIG. 3 to continue the cleaning. Instead, the second cleaning route starting from the closest charging port 301 and directed to the target area that has not been cleaned by the cleaning robot is re-planned. Then, the cleaning robot is controlled to work along the second cleaning route, thus improving cleaning efficiency of the cleaning robot.

In this embodiment, when charging the cleaning robot at the closest charging port is completed, if there is any un-cleaned area, a second cleaning route starting from the closest charging port and directed to the target area which has not been cleaned by the cleaning robot is determined. Then the cleaning robot is controlled to clean along the second cleaning route instead of continue cleaning along a previous route from the last position where the cleaning process is interrupted, thus improving cleaning efficiency of the cleaning robot.

In an alternative embodiment, determining that the cleaning robot needs to be charged at block 102 in the charging method for the cleaning robot may be performed as act D1.

In act D1, when the cleaning robot finishes a cleaning task, it is determined whether the cleaning robot needs to be charged.

In an embodiment, when the cleaning robot finishes the cleaning task and no more work needs to be done, the cleaning robot may move to a charging port to charge and prepare for a next task.

In this embodiment, when the cleaning robot finishes the cleaning task, it is determined that the cleaning robot needs to be charged, and the cleaning robot may be controlled to move to the charging port to be charged and prepare for a next task, thus avoiding the cleaning efficiency being affected by insufficient power supply at the next task.

In an alternative embodiment, the block 103 in the charging method for the cleaning robot may further include acts E1 and E2.

In act E1, respective paths on a current cleaning route from a current position of the cleaning robot to the plurality of charging ports are calculated based on the position information of the plurality of charging ports and the current position information of the cleaning robot.

In act E2, a closest charging port corresponding to a shortest path among the respective paths to the plurality of charging ports is determined.

In an embodiment, still referring to FIG. 3, when the cleaning robot 300 is executing the cleaning task and there are still some areas, for example room 1, haven't been cleaned, the electric quantity of the cleaning robot 300 becomes less than the preset value and it is determined that the cleaning robot 300 needs to be charged. In this case, a current cleaning route 303 of the cleaning robot 300 may be considered when determining the closest charging port and used for calculating respective paths from the cleaning robot 300 to the plurality of charging ports 301 and 302. It can be seen from FIG. 3 that the path for the cleaning robot to arrive at charging port 301 along the current cleaning route is path 304, which is much shorter than the path for the cleaning robot to arrive at charging port 302 along the current cleaning route. Therefore the cleaning robot 300 may chose the closest charging port, i.e. charging port 301 to charge. By this way, the cleaning robot may continue cleaning during the way to the charging port 301, thus increasing the cleaning efficiency.

In this embodiment, the respective paths on the current cleaning route from a current position of the cleaning robot to the plurality of charging ports are calculated and the closest charging port corresponding to the shortest cleaning path among the respective paths to the plurality of charging ports is determined. By this way, the cleaning robot may continue cleaning during the way to the closest charging port to charge, thus increasing the cleaning efficiency.

Details of the process will be illustrated with reference to some embodiments as follows.

Figure 4:
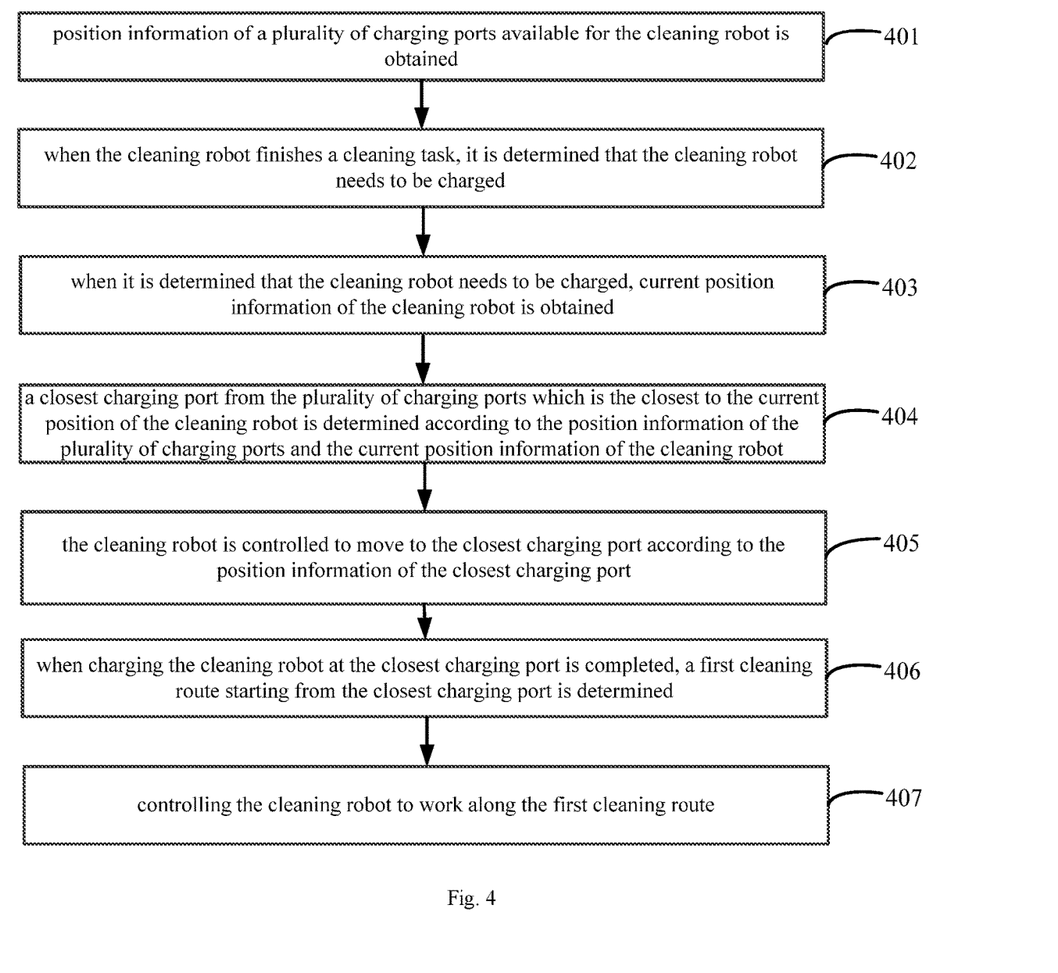
FIG. 4 is a flow chart showing a charging method for a cleaning robot according to an exemplary embodiment.

FIG. 4 is a flow chart showing a charging method for a cleaning robot according to an exemplary embodiment. As shown in FIG. 4, the method can be performed by a device such as a terminal, and the method includes blocks 401 to 407.

At block 401, position information of a plurality of charging ports available for the cleaning robot is obtained.

At block 402, when the cleaning robot finishes a cleaning task, it is determined that the cleaning robot needs to be charged.

At block 403, when it is determined that the cleaning robot needs to be charged, current position information of the cleaning robot is obtained.

At block 404, a closest charging port from the plurality of charging ports which is the closest to the current position of the cleaning robot is determined according to the position information of the plurality of charging ports and the current position information of the cleaning robot.

At block 405, the cleaning robot is controlled to move to the closest charging port according to the position information of the closest charging port.

At block 406, when charging the cleaning robot at the closest charging port is completed, a first cleaning route starting from the closest charging port is determined.

At block 407, the cleaning robot is controlled to work along the first cleaning route.

Figure 5:
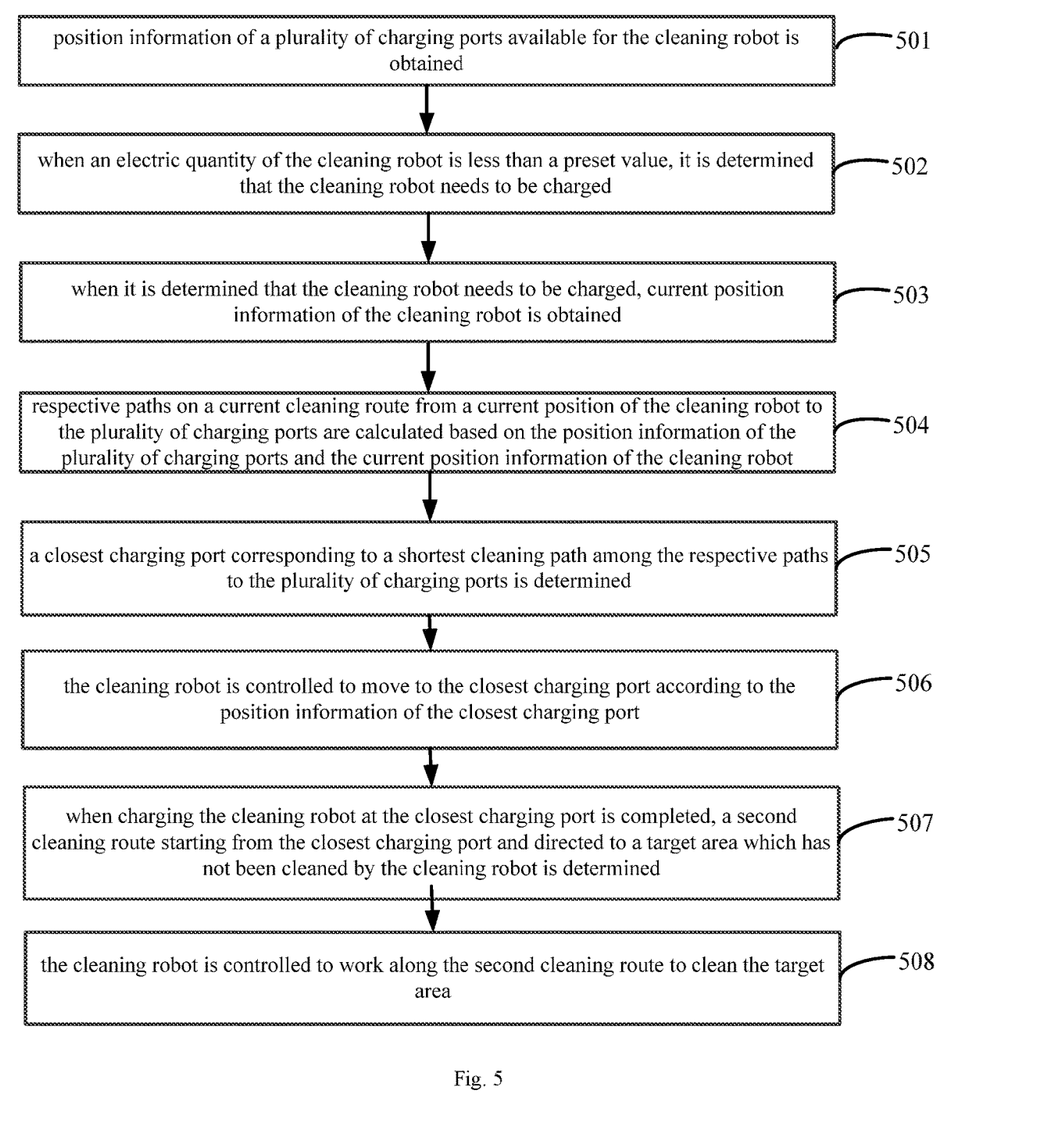
FIG. 5 is a flow chart showing a charging method for a cleaning robot according to an exemplary embodiment.

FIG. 5 is a flow chart showing a charging method of a cleaning robot according to an exemplary embodiment. As shown in FIG. 5, the method can be performed by a device such as a terminal, and the method includes blocks 501 to 507.

At block 501, position information of a plurality of charging ports available for the cleaning robot is obtained.

At block 502, when an electric quantity of the cleaning robot is less than a preset value, it is determined that the cleaning robot needs to be charged.

At block 503, when it is determined that the cleaning robot needs to be charged, current position information of the cleaning robot is obtained.

At block 504, respective paths on a current cleaning route from a current position of the cleaning robot to the plurality of charging ports are calculated based on the position information of the plurality of charging ports and the current position information of the cleaning robot.

At block 505, a closest charging port corresponding to a shortest path among the respective paths to the plurality of charging ports is determined.

At block 506, the cleaning robot is controlled to move to the closest charging port according to the position information of the closest charging port.

At block 507, when charging the cleaning robot at the closest charging port is completed, a second cleaning route starting from the closest charging port and directed to a target area which has not been cleaned by the cleaned robot is determined.

At block 508, the cleaning robot is controlled to work along the second cleaning route to clean the target area.

The followings are apparatus embodiments of the present disclosure and may be used to perform the method embodiments of the present disclosure.

Figure 6:
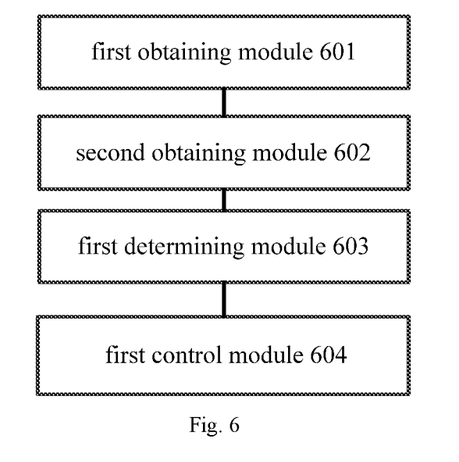
FIG. 6 is a block diagram illustrating a charging apparatus of a cleaning robot according to an exemplary embodiment.

FIG. 6 is a block diagram illustrating a charging apparatus of a cleaning robot according to an exemplary embodiment. The apparatus may be achieved by software or hardware or a combination thereof, and works as parts or all of an electronic device. As shown in FIG. 6, the charging apparatus of the cleaning robot may include a first obtaining module 601, a second obtaining module 602, a first determining module 603 and a first control module 604.

The first obtaining module 601 is configured to obtain position information of a plurality of charging ports available for the cleaning robot.

The second obtaining module 602 is configured to obtain current position information of the cleaning robot when it is determined that the cleaning robot needs to be charged.

The first determining module 603 is configured to determine a closest charging port from the plurality of charging ports which is the closest to a current position of the cleaning robot according to the position information of the plurality of charging ports and the current position information of the cleaning robot.

The first control module 604 is configured to control the cleaning robot to move to the closest charging port to charge according to the position information of the closest charging port.

Figure 7:
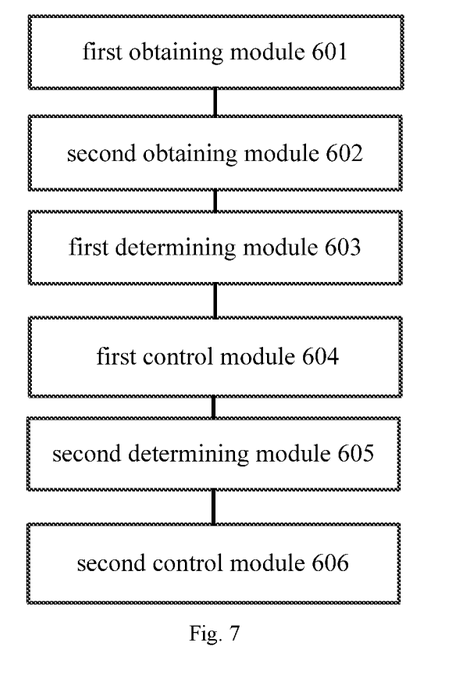
FIG. 7 is a block diagram illustrating a charging apparatus of a cleaning robot according to an exemplary embodiment.

As an alternative embodiment, the above charging apparatus of the cleaning robot may further be configured to include a second determining module 605 and a second control module 606. FIG. 7 is a block diagram illustrating this charging apparatus of the cleaning robot.

The second determining module 605 is configured to determine a first cleaning route starting from the closest charging port when charging the cleaning robot at the closest charging port is completed.

The second control module 606 is configured to control the cleaning robot to work along the first cleaning route.

Figure 8:
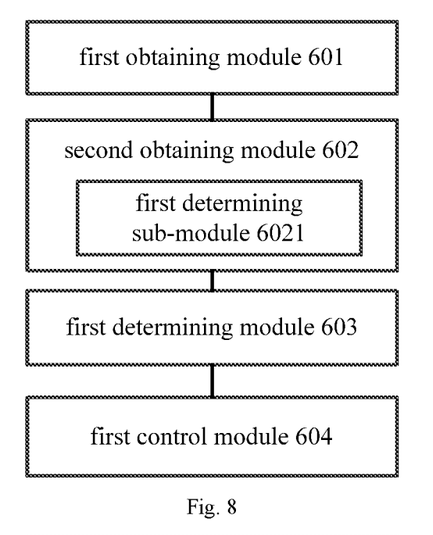
FIG. 8 is a block diagram illustrating a charging apparatus of a cleaning robot according to an exemplary embodiment.

As an alternative embodiment, the second obtaining module 602 of the above charging apparatus of the cleaning robot may further be configured to include a first determining sub-module 6021. FIG. 8 is a block diagram illustrating such charging apparatus of the cleaning robot.

The first determining sub-module 6021 is configured to determine that the cleaning robot needs to be charged when a remaining electric quantity of the cleaning robot is less than a preset value.

Figure 9:
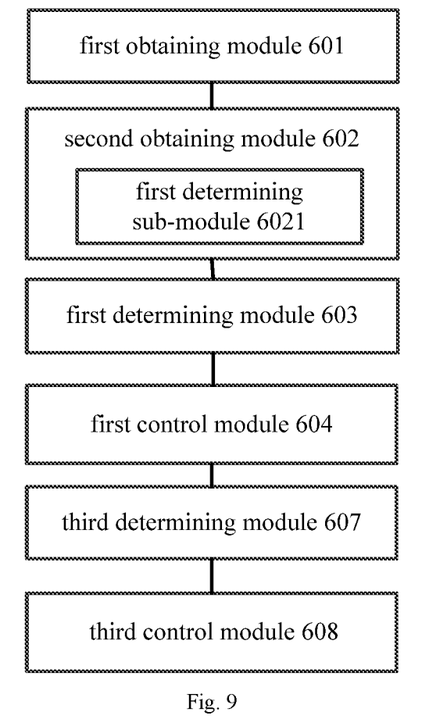
FIG. 9 is a block diagram illustrating a charging apparatus of a cleaning robot according to an exemplary embodiment.

As an alternative embodiment, the above charging apparatus of the cleaning robot may further be configured to include a third determining module 607 and a third control module 608. FIG. 9 is a block diagram illustrating such charging apparatus of the cleaning robot.

The third determining module 607 is configured to determine a second cleaning route starting from the closest charging port and directed to a target area which has not been cleaned by the cleaning robot, when the cleaning robot is controlled to finish charging at the closest charging port and begins to work.

The third control module 608 is configured to control the cleaning robot to work along the second cleaning route to clean the target area.

Figure 10:
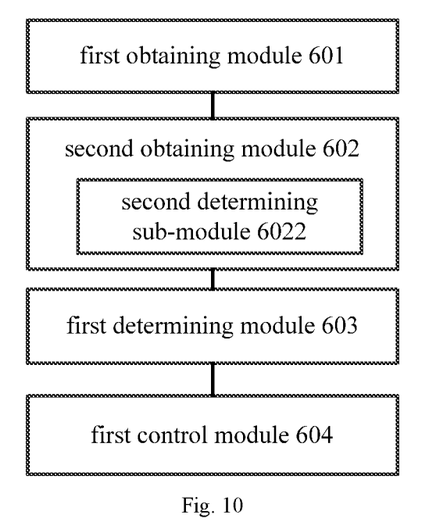
FIG. 10 is a block diagram illustrating a charging apparatus of a cleaning robot according to an exemplary embodiment.

As an alternative embodiment, the second obtaining module 602 of the above charging apparatus of the cleaning robot may further be configured to include a second determining sub-module 6022. FIG. 10 is a block diagram illustrating such charging apparatus of the cleaning robot.

The second determining sub-module 6022 is configured to determine that the cleaning robot needs to be charged when the cleaning robot finishes a cleaning task.

Figure 11:
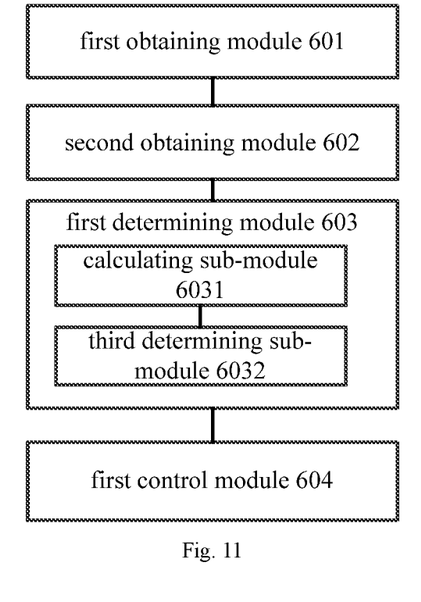
FIG. 11 is a block diagram illustrating a charging apparatus of a cleaning robot according to an exemplary embodiment.

As an alternative embodiment, the first determining module 603 of the above c charging apparatus of the leaning robot may further be configured to include a calculating sub-module 6031 and a third determining sub-module 6032. FIG. 11 is a block diagram illustrating such charging apparatus of the cleaning robot.

The calculating sub-module 6031 is configured to calculate respective paths on a current cleaning route from a current position of the cleaning robot to the plurality of charging ports based on the position information of the plurality of charging ports and the current position information of the cleaning robot.

The third determining sub-module 6032 is configured to determine a closest charging port corresponding to a shortest path among the respective paths to the plurality of charging ports.

With regard to the apparatus of the above embodiment, the specific operation manners for individual modules therein refer to those described in detail in the embodiments regarding the methods, which are not elaborated herein again.

Figure 12:
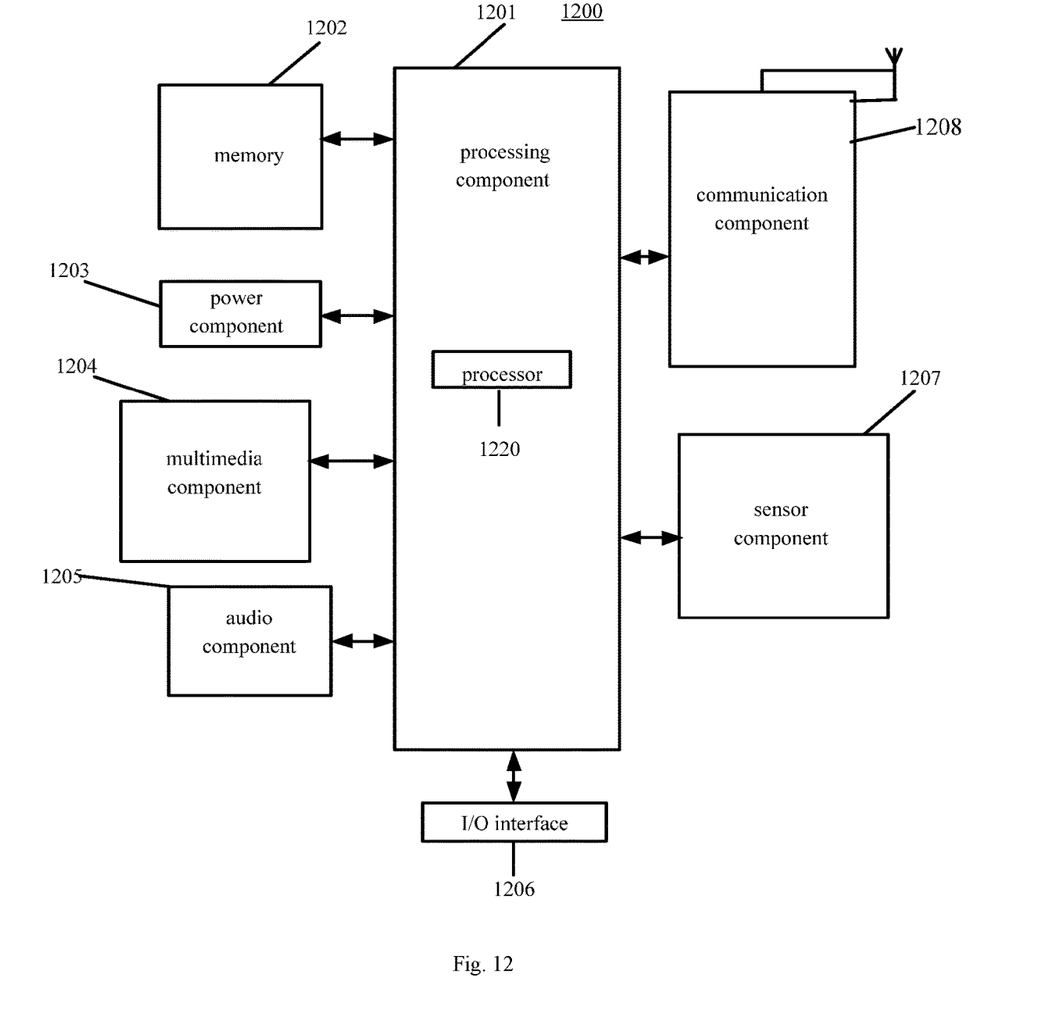
FIG. 12 is a block diagram illustrating a charging device of a cleaning robot according to an exemplary embodiment.

FIG. 12 is a block diagram illustrating a charging device of a cleaning robot according to an exemplary embodiment. The device may be applied to smart cleaning terminals such as cleaning robots.

Device 1200 may include one or more of the following components: a processing component 1201, a memory 1202, a power component 1203, a multimedia component 1204, an audio component 1205, an input/output (I/O) interface 1206, a sensor component 1207, and a communication component 1208.

The processing component 1201 typically controls overall operations of the device 1200, such as the operations associated with display, route calculation and recording. The processing component 1201 may include one or more processors 1220 to execute instructions to perform all or part of the steps in the above described methods. Moreover, the processing component 1201 may include one or more modules which facilitate the interaction between the processing component 1201 and other components. For instance, the processing component 1201 may include a multimedia module to facilitate the interaction between the multimedia component 1204 and the processing component 1201.

The memory 1202 is configured to store various types of data to support the operations of the device 1200. Examples of such data include instructions for any applications or methods operated on the device 1200, messages, pictures, etc. The memory 1202 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1203 provides power to various components of the device 1200. The power component 1203 may include a power management system, one or more power sources, and any other components associated with the generation, management, and distribution of power in the device 1200.

The multimedia component 1204 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1204 includes one or more cameras. When the device 1200 is in a cleaning mode, the cameras may be used to obtain outside multimedia data. Each of the cameras may be a fixed optical lens system or have focus and optical zoom capability.

The audio component 1205 is configured to output and/or input audio signals. For example, the audio component 1205 includes a microphone (MIC) configured to receive an external audio signal when the device 1200 is in an operation mode, such as a speech recognition mode. The received audio signal may be further stored in the memory 1202 for the processing component 1201 to perform speech recognition. In some embodiments, the audio component 1205 further includes a speaker to output audio signals.

The I/O interface 1206 provides an interface between the processing component 1201 and peripheral interface modules, such as a keyboard, a click wheel, buttons, and the like. The buttons may include, but are not limited to, a home button, a volume button, a starting button, and a locking button.

The sensor component 1207 includes one or more sensors to provide status assessments of various aspects of the device 1200. The sensor component 1207 may include a proximity sensor configured to detect the presence of nearby objects without any physical contact. The sensor component 1207 may also include a light sensor, such as a CMOS or CCD image sensor, for use in imaging applications. In some embodiments, the sensor component 1207 may also include an accelerometer sensor, or a humidity sensor.

The communication component 1208 is configured to facilitate communication, wired or wirelessly, between the device 1200 and other devices. The device 1200 can access a wireless network based on a communication standard, such as WIFI, 2G or 3G or a combination thereof. In one exemplary embodiment, the communication component 1208 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 1202 including instructions, the above instructions are executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

It is also provided in the present disclosure a charging device of a cleaning robot, including: a processor; a memory for storing instructions executable by the processor; in which, the processor is configured to perform the acts of: obtaining position information of a plurality of charging ports available for the cleaning robot; when it is determined that the cleaning robot needs to be charged, obtaining current position information of the cleaning robot; determining a closest charging port from the plurality of charging ports which is the closest to a current position of the cleaning robot according to the position information of the plurality of charging ports and the current position information of the cleaning robot; and controlling the cleaning robot to move to the closest charging port to charge according to the position information of the closest charging port.

The processor may also be configured to perform acts of: when charging the cleaning robot at the closest charging port is completed, determining a first cleaning route starting from the closest charging port; controlling the cleaning robot to work along the first cleaning route.

The processor may also be configured to determine that the cleaning robot needs to be charged by an act of: determining that the cleaning robot needs to be charged when a remaining electric quantity of the cleaning robot is less than a preset value.

The processor may also be configured to perform act of: when charging the cleaning robot at the closest charging port is completed, determining a second cleaning route starting from the closest charging port and directed to a target area which has not been cleaned by the cleaning robot; and controlling the cleaning robot to work along the second cleaning route to clean the target area.

The processor may also be configured to determine that the cleaning robot needs to be charged by an act of: determining that the cleaning robot needs to be charged when the cleaning robot finishes a cleaning task.

The processor may also be configured to determine a closest charging port from the plurality of charging ports which is the closest to a current position of the cleaning robot according to the position information of the plurality of charging ports and the current position information of the cleaning robot by act of: calculating respective paths on a current cleaning route from the cleaning robot to the plurality of charging ports based on the position information of the plurality of charging ports and the current position information of the cleaning robot; determining a closest charging port corresponding to a shortest path among the respective paths to the plurality of charging ports.

It is also provided in embodiments of the present disclosure a non-transitory computer-readable storage medium, stored with computer programs that are applied to a cleaning robot and when executed by a processor, cause the processor to perform following acts: obtaining position information of a plurality of charging ports available for the cleaning robot; when it is determined that the cleaning robot needs to be charged, obtaining current position information of the cleaning robot; determining a closest charging port from the plurality of charging ports which is the closest to a current position of the cleaning robot according to the position information of the plurality of charging ports and the current position information of the cleaning robot; controlling the cleaning robot to move to the closest charging port according to the position information of the closest charging port.

The computer programs stored in the non-transitory computer-readable storage medium may further be executed to perform the following acts: when charging the cleaning robot at the closest charging port is completed, determining a first cleaning route starting from the closest charging port; controlling the cleaning robot to work along the first cleaning route.

The computer programs stored in the non-transitory computer-readable storage medium may further be executed to achieve the following acts: determining that the cleaning robot needs to be charged includes: determining that the cleaning robot needs to be charged when a remaining electric quantity of the cleaning robot is less than a preset value.

The computer programs stored in the non-transitory computer-readable storage medium may further be executed to achieve the following acts: when charging the cleaning robot at the closest charging port is completed, determining a second cleaning route starting from the closest charging port and directed to a target area which has not been cleaned by the cleaning robot; controlling the cleaning robot to work along the second cleaning route to clean the target area.

The computer programs stored in the non-transitory computer-readable storage medium may further be executed to achieve the following acts: determining that the cleaning robot needs to be charged includes: determining that the cleaning robot needs to be charged when the cleaning robot finishes a cleaning task.

The computer programs stored in the non-transitory computer-readable storage medium may further be executed to determine a closest charging port from the plurality of charging ports which is the closest to a current position of the cleaning robot according to the position information of the charging ports and the current position information of the cleaning robot by acts of: calculating respective paths on a current cleaning route from a current position of the cleaning robot to the plurality of charging ports based on the position information of the plurality of charging ports and the current position information of the cleaning robot; determining a closest charging port corresponding to a shortest path among the respective paths to the plurality of charging ports.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A charging method for a cleaning robot, comprising:
obtaining position information of a plurality of charging ports available for the cleaning robot;
determining that the cleaning robot needs to be charged;
obtaining current position information of the cleaning robot;
determining a closest charging port from the plurality of charging ports which is the closest to a current position of the cleaning robot according to the position information of the plurality of charging ports and the current position information of the cleaning robot; and
controlling the cleaning robot to move to the closest charging port to charge according to the position information of the closest charging port;
wherein determining that the cleaning robot needs to be charged comprises:
determining that the cleaning robot needs to be charged when a remaining electric quantity of the cleaning robot is less than a preset value, wherein the preset value is set as an electric quantity which covers highest power consumption for the cleaning robot to move from the closest charging port to a farthest position when the cleaning robot performs a cleaning operation at the same time.

2. The method according to claim 1, further comprising:
determining a first cleaning route starting from the closest charging port when charging the cleaning robot at the closest charging port is completed;
controlling the cleaning robot to work along the first cleaning route.

3. The method according to claim 1, further comprising:
    determining a second cleaning route starting from the closest charging port and directed to a target area which has not been cleaned by the cleaning robot, when charging the cleaning robot at the closest charging port is completed;
    controlling the cleaning robot to work along the second cleaning route to clean the target area.

4. The method according to claim 1, wherein, determining that the cleaning robot needs to be charged comprises:
    determining that the cleaning robot needs to be charged when the cleaning robot finishes a cleaning task.

5. The method according to claim 1, wherein, determining a closest charging port from the plurality of charging ports which is the closest to the current position of the cleaning robot according to the position information of the plurality of charging ports and the current position information of the cleaning robot comprises:
    calculating, on a current cleaning route, respective paths to the plurality of charging ports from a current position of the cleaning robot based on the position information of the plurality of charging ports and the current position information of the cleaning robot;
    determining a closest charging port corresponding to a shortest path among the respective paths to the plurality of charging ports.

6. A charging device for a cleaning robot, comprising:
    a processor;
    a memory for storing instructions executable by the processor;
    wherein, the processor is configured to perform the acts of:
    obtaining position information of a plurality of charging ports available for the cleaning robot;
    determining that the cleaning robot needs to be charged;
    obtaining current position information of the cleaning robot;
    determining a closest charging port from the plurality of charging ports which is the closest to a current position of the cleaning robot according to the position information of the plurality of charging ports and the current position information of the cleaning robot; and
    controlling the cleaning robot to move to the closest charging port to charge according to the position information of the closest charging port;
    wherein determining that the cleaning robot needs to be charged comprises:
    determining that the cleaning robot needs to be charged when a remaining electric quantity of the cleaning robot is less than a preset value, wherein the preset value is set as an electric quantity which covers highest power consumption for the cleaning robot to move from the closest charging port to a farthest position when the cleaning robot performs a cleaning operation at the same time.

7. The device according to claim 6, wherein the processor is configured to perform acts of:
    determining a first cleaning route starting from the closest charging port when charging the cleaning robot at the closest charging port and is completed;
    controlling the cleaning robot to work along the first cleaning route.

8. The device according to claim 6, wherein the processor is configured to perform acts of:
    determining a second cleaning route starting from the closest charging port and directed to a target area which has not been cleaned by the cleaning robot, when charging the cleaning robot at the closest charging port is completed;
    controlling the cleaning robot to work along the second cleaning route to clean the target area.

9. The device according to claim 6, wherein, determining that the cleaning robot needs to be charged comprises:
    determining that the cleaning robot needs to be charged when the cleaning robot finishes a cleaning task.

10. The device according to claim 6, wherein, determining a closest charging port from the plurality of charging ports which is the closest to the current position of the cleaning robot according to the position information of the plurality of charging ports and the current position information of the cleaning robot comprises:
    calculating, on a current cleaning route, respective paths to the plurality of charging ports from a current position of the cleaning robot based on the position information of the plurality of charging ports and the current position information of the cleaning robot;
    determining a closest charging port corresponding to a shortest path among the respective paths to the plurality of charging ports.

11. A non-transitory computer-readable storage medium, stored with computer programs that are applied to a cleaning robot and when executed by a processor, cause the processor to perform a method, which includes:
    obtaining position information of a plurality of charging ports available for the cleaning robot;
    determining that the cleaning robot needs to be charged;
    obtaining current position information of the cleaning robot;
    determining a closest charging port from the plurality of charging ports which is the closest to a current position of the cleaning robot according to the position information of the plurality of charging ports and the current position information of the cleaning robot; and
    controlling the cleaning robot to move to the closest charging port to charge according to the position information of the closest charging port;
    wherein determining that the cleaning robot needs to be charged comprises:
    determining that the cleaning robot needs to be charged when a remaining electric quantity of the cleaning robot is less than a preset value, wherein the preset value is set as an electric quantity which covers highest power consumption for the cleaning robot to move from the closest charging port to a farthest position when the cleaning robot performs a cleaning operation at the same time.

12. The non-transitory computer-readable storage medium according to claim 11, wherein the method further comprises:
    determining a first cleaning route starting from the closest charging port when charging the cleaning robot at the closest charging port is completed;
    controlling the cleaning robot to work along the first cleaning route.

13. The non-transitory computer-readable storage medium according to claim 11, wherein the method further comprises:
    determining a second cleaning route starting from the closest charging port and directed to a target area which has not been cleaned by the cleaning robot, when charging the cleaning robot at the closest charging port is completed;

controlling the cleaning robot to work along the second cleaning route to clean the target area.

14. The non-transitory computer-readable storage medium according to claim 11, wherein, determining that the cleaning robot needs to be charged comprises:

determining that the cleaning robot needs to be charged when the cleaning robot finishes a cleaning task.

15. The non-transitory computer-readable storage medium according to claim 11, wherein, determining a closest charging port from the plurality of charging ports which is closest to the current position of the cleaning robot according to the position information of the plurality of charging ports and the current position information of the cleaning robot comprises:

calculating, on a current cleaning route, respective paths to the plurality of charging ports from a current position of the cleaning robot based on the position information of the plurality of charging ports and the current position information of the cleaning robot;

determining a closest charging port corresponding to a shortest path among the respective paths to the plurality of charging ports.

\* \* \* \* \*